United States Patent [19]

Steiner

[11] Patent Number: 4,483,092
[45] Date of Patent: Nov. 20, 1984

[54] BAIT STORAGE APPARATUS AND TECHNIQUE FOR FISHERMEN

[76] Inventor: John Steiner, 44314-216th Ave., SE., Enumclaw, Wash. 98022

[21] Appl. No.: 409,587

[22] Filed: Aug. 19, 1982

[51] Int. Cl.³ .............................................. A01K 97/04
[52] U.S. Cl. ....................................... 43/55; 221/185; 221/188
[58] Field of Search ..................... 43/55; 221/185, 188, 221/172, 288, 177, 263

[56] References Cited

U.S. PATENT DOCUMENTS

| | | | |
|---|---|---|---|
| 1,611,275 | 12/1926 | Lewis | 43/55 X |
| 1,945,144 | 1/1934 | Follett et al. | 221/185 X |
| 1,955,559 | 4/1934 | Narrow | 43/55 X |
| 2,117,685 | 5/1938 | Smith, Jr. | 43/55 |
| 2,443,861 | 6/1948 | Johnston | 43/55 X |
| 2,480,764 | 8/1949 | Pennington | 221/185 X |
| 2,518,986 | 8/1950 | Griffith | 43/55 X |
| 2,560,381 | 7/1951 | Babinton | 43/55 X |
| 2,681,529 | 6/1954 | Braithwaite | 43/55 |
| 2,702,960 | 3/1955 | Weaver | 43/55 X |
| 2,763,956 | 9/1956 | Olson | 43/55 |
| 2,787,080 | 4/1957 | Wells | 43/55 |
| 2,794,289 | 6/1957 | Sanford | 43/55 |
| 2,853,083 | 9/1958 | Roedelheimer et al. | 221/185 X |
| 2,857,705 | 10/1958 | Woodcock | 43/55 |
| 3,091,364 | 5/1963 | Ayres | 221/185 X |
| 3,313,448 | 4/1967 | Suttle et al. | 221/185 |
| 3,484,818 | 12/1969 | Ino | 221/288 |
| 3,601,250 | 8/1971 | Merila | 221/188 X |
| 3,886,679 | 6/1975 | Marcell | 43/55 |
| 4,133,452 | 1/1979 | Wiltrout | 221/185 |

FOREIGN PATENT DOCUMENTS

| | | | |
|---|---|---|---|
| 1102636 | 3/1961 | Fed. Rep. of Germany | 221/177 |
| 1098150 | 7/1955 | France | 221/263 |
| 1328990 | 4/1963 | France | 221/263 |

Primary Examiner—Nicholas P. Godici
Assistant Examiner—P. Weston Musselman, Jr.
Attorney, Agent, or Firm—Christopher Duffy

[57] ABSTRACT

The apparatus and technique enable a fisherman to store a batch of fish bait morsels on his body in such a way that when he needs one, he can isolate it from the batch and pluck it out of storage on the hook of his line, or between the thumb and one finger of his free hand. According to the technique, a support is formed on his body opposite the front thereof, and a device is pivotally mounted on the support which is adaptable to form an open-ended container for the morsels. The device is swingable between a first position in which the morsels are retained in the container against discharge through the end opening of the same by gravity, and a second position in which one or more morsels tend to discharge through the end opening of the container by gravity. In addition, a recess is formed on the device into which a morsel or morsels can discharge from the end opening of the container when the container is swung between the first and second positions thereof, respectively. The recess is open to the ambient surroundings of the container, but the opening is covered when the container is disposed in the first position thereof, by means which are shiftable in relation to the rim of the opening to expose the opening to the ambient surroundings of the container when it assumes the second position thereof. The opening is adapted, however, when it is so exposed, so that the morsels remain cradled in the recess while the fisherman is able to pluck one of them from the recess on the hook of his line or between the thumb and one finger of his free hand.

21 Claims, 9 Drawing Figures

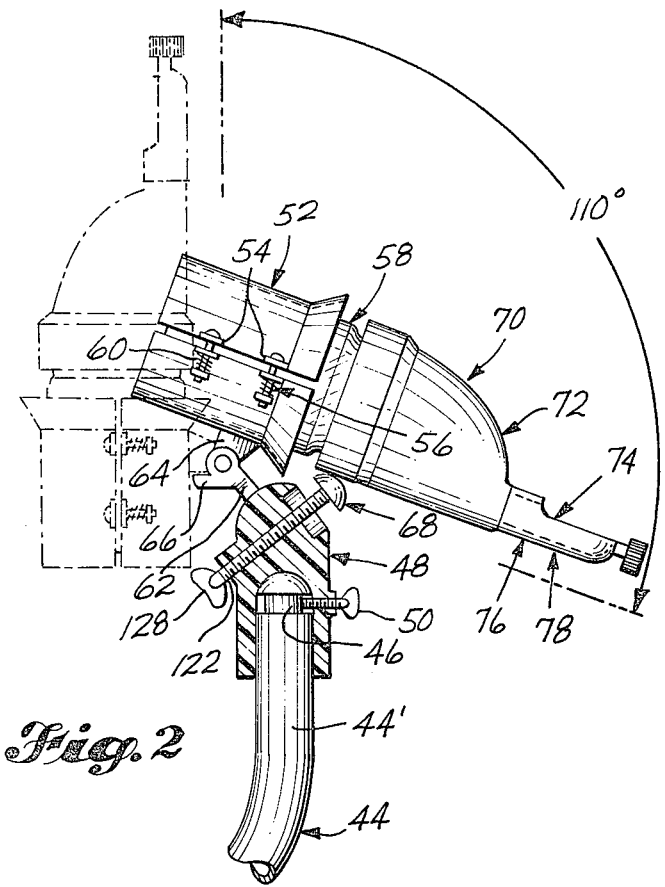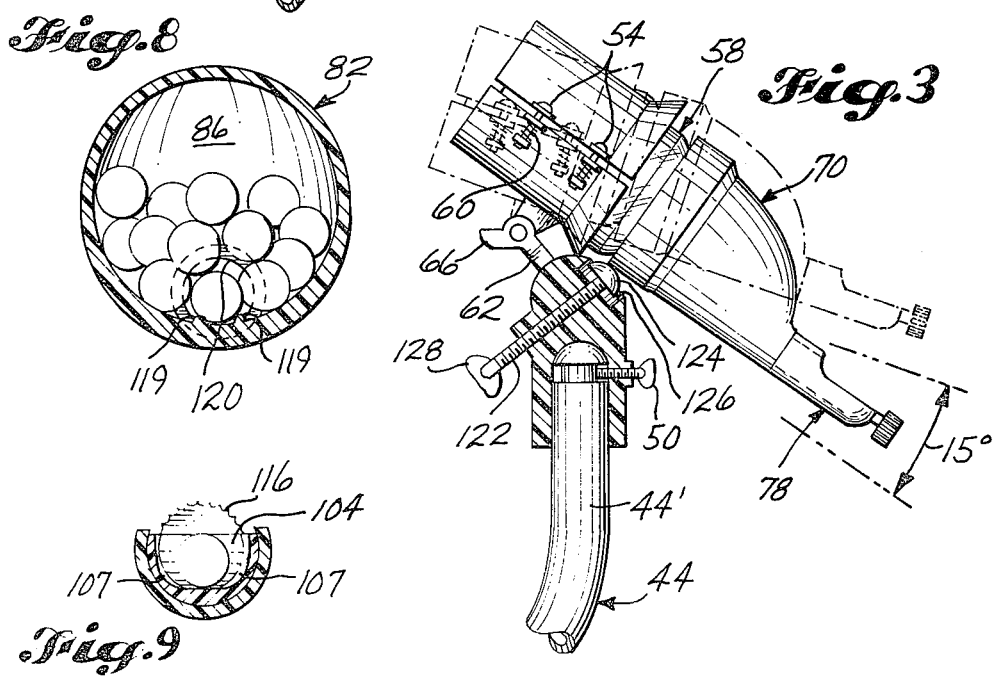

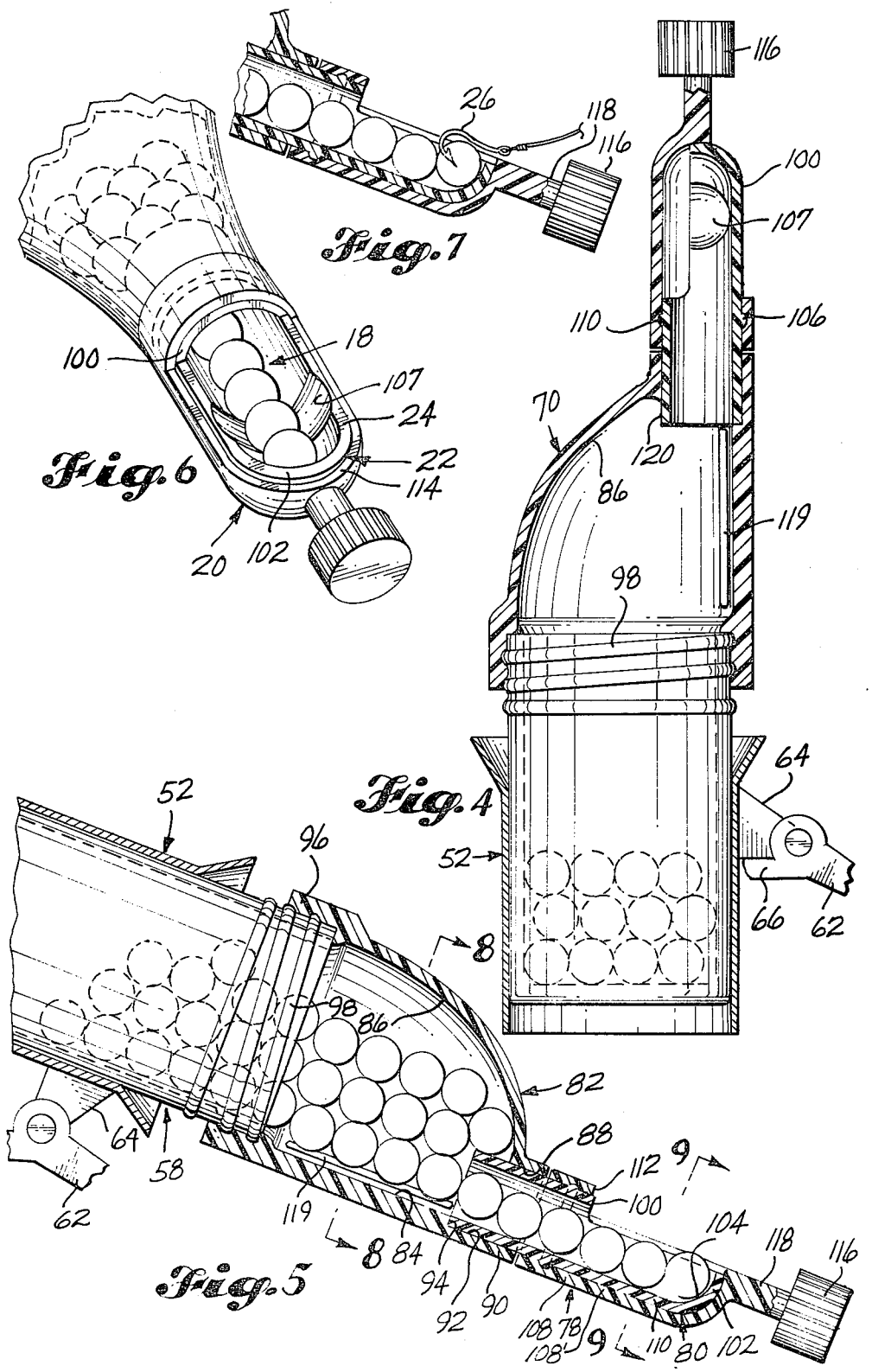

BAIT STORAGE APPARATUS AND TECHNIQUE FOR FISHERMEN

THE INVENTION IN GENERAL

This invention relates to an apparatus and technique whereby a fisherman can store a batch of fish bait morsels on his body, and when he needs one, isolate it from the batch and pluck it out of storage on the hook of his line, or between the thumb and one finger of his free hand. The apparatus and technique are particularly applicable to storing and using salmon eggs as bait.

According to the technique, a support is formed on his body opposite the front thereof, and a device is pivotally mounted on the support which is adaptable to form an open-ended container for the morsels. The device is swingable between a first position in which the morsels are retained in the container against discharge through the end opening of the same by gravity, and a second position in which one or more morsels tend to discharge through the end opening of the container by gravity. In addition, a recess is formed on the device into which a morsel or morsels can discharge from the end opening of the container when the container is swung between the first and second positions thereof, respectively. The recess is open to the ambient surroundings of the container, but the opening is covered when the container is disposed in the first position thereof, by means which are shiftable in relation to the rim of the opening to expose the opening to the ambient surroundings of the container when it assumes the second position thereof. The opening is adapted, however, when it is so exposed, so that the morsels remain cradled in the recess while the fisherman is able to pluck one of them from the recess on the hook of his line or between the thumb and one finger of his free hand.

Preferably, the recess is an elongated trough-like recess, and the morsels are caused to collimate in the same lengthwise thereof when the container is swung between the first and second positions thereof, respectively. Also, the cover means are preferably rotatable about the longitudinal axis of the recess and ported to expose the recess in one angular orientation thereof. In addition, the cover means are normally manually rotatable about the axis of the recess.

The support is often formed on a bibb-like harnness which the fisherman mounts on his torso. Also, it often takes the form of a sconce-like support on the bibb of the harness.

The apparatus comprises means for forming a support on the fisherman's body opposite the front thereof, and a device which is adaptable to form an open-ended container for the morsels and pivotally mountable on the support to swing between a first position in which the morsels are retained in the container against discharge through the end opening of the same by gravity, and a second position in which one or more morsels tend to discharge through the end opening of the container by gravity. The apparatus also comprises lid-forming means for the container which also form a recess on the device into which a morsel or morsels can discharge from the end opening of the container when the container is swung between the first and second positions thereof, respectively. The recess is open to the ambient surroundings of the container, as indicated, but there are means on the device for covering the opening when the container is disposed in the first position thereof. The cover means are shiftable in relation to the rim of the opening to expose the opening to the ambient surroundings of the container when the container assumes the second position thereof. However, the opening is adapted when it is so exposed, so that the morsels remain cradled in the recess while the fisherman is able to pluck one of the morsels from the recess on the hook of his line or between the thumb and one finger of his free hand.

In many of the presently preferred embodiments of the invention, the recess is an elongated trough-like recess, and there are means for causing the morsels to collimate in the same lengthwise thereof when the container is swung between the first and second positions thereof, respectively. Also, the cover means are engaged on the device to rotate about the longitudinal axis of the recess, there being a port in the cover means registrable with the opening of the recess to expose the same to the ambient surroundings of the container in one angular orientation of the cover means.

In some embodiments, there are means forming a chute between the container and the recess, and means adjacent the outlet of the chute for collimating the morsels in the recess lengthwise thereof. For example, in certain embodiments, there are means in the bottom of the chute, such as a pair of spaced parallel ribs on the floor of the same, and a marquee between the floor and ceiling of the same to limit rotational and transverse movement of the morsels adjacent the outlet of the chute, respectively.

The recess may be filleted at the distal end thereof to elevate the forwardmost morsel for impalement by a hook. Additionally, the opposing side walls of the recess may have ramps thereon which are inclined to the bottom of the recess so that a morsel can be slid or otherwise manipulated up the incline of one of the same to a point at which it can be gripped between the fisherman's finger and thumb for removal from the apparatus.

The cover means are preferably transparent to enable the morsel or morsels to be seen in the recess when the opening thereof is covered by the same.

In one group of embodiments, the recess-defining portion of the lid-forming means is cylindrical and the cover means are engaged on the same to rotate about the cylindrical axis thereof. In certain embodiments, the recess-defining portion and the cover means include a pair of telescopically engaged members, the inner of which has a top opening therein when the container is disposed in the second position thereof, and the outer of which has a port therein adapted to register with the opening in one angular orientation of the outer member about the inner member, but to be removed from registry with the opening when the outer member is rotated 180° from said orientation.

The device often includes means adapatable to hold an open-ended container in the aforesaid positions and to which the recess-defining means are connectable at the open end thereof. For example, in certain of the presently preferred embodiments of the invention, the container-holding means have a socket therein to receive the container, and there are means on the same for retaining the container within the socket.

As indicated earlier, the support-forming means often take the form of a bibb-like harness mountable on the fisherman's torso to provide a sconce-like support at the front thereof. In some embodiments, the harness has an L-shaped support thereon, one leg of which is vertically upstanding opposite the bibb of the harness and has a swivel head at the top thereof. The device is pivotally mounted on an arm cantilevered from the head to swing between the respective positions of the container in the various angular orientations of the head.

Preferably, the apparatus further comprises means forming stops for the respective positions of the container. Also, one stop is preferably adjustable to vary the inclination at which the container assumes the second position thereof.

BRIEF DESCRIPTION OF THE DRAWINGS

These features will be better understood by reference to the accompanying drawings which illustrates one of those presently preferred embodiments of the invention which are equipped with a container-holding device for storing salmon eggs.

In the drawings.

FIG. 2 is a part side elevational view of the container-holding device, illustrating the respective positions thereof on the support;

FIG. 3 is a similar view illustrating the manner in which the inclination of the container can be varied in the second position thereof;

FIG. 4 is a part longitudinal cross-section view of the device in the vertically upstanding position of the container;

FIG. 5 is a similar view of the device in the inclined position of the container;

FIG. 6 is a part perspective view of the covered but selectively uncoverable trough-like recess for receiving one or more eggs to be removed from the apparatus;

FIG. 7 is a part longitudinal cross-sectional view of the recess illustrating the manner in which the forward-most egg can be impaled by the fisherman's hook to remove it from the apparatus;

FIG. 8 is a cross-sectional view along the line 8—8 of FIG. 5; and

FIG. 9 is a similar view along the line 9—9 of FIG. 5.

DESCRIPTION OF THE PREFERRED EMBODIMENT

Figure 1:
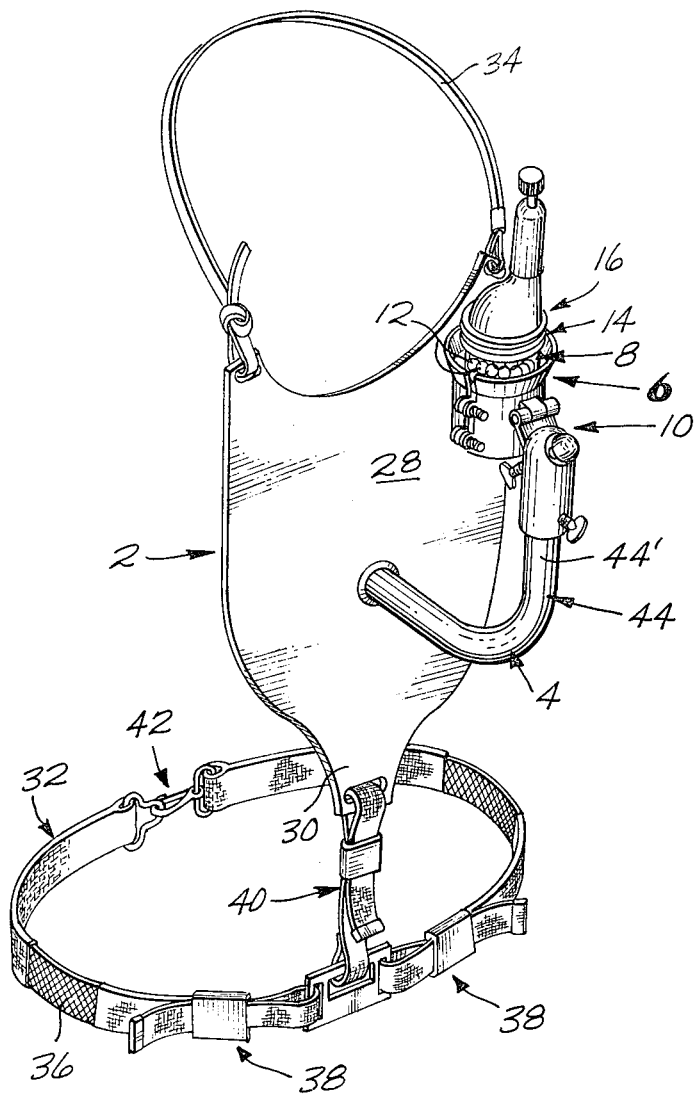
FIG. 1 is a perspective view of the embodiment.

Referring to the drawings, it will be seen that the apparatus comprises a bibb-like harness 2 with which the fisherman can form a sconce-like support 4 on the front of his torso. It also comprises a socket-like device 6 which is adaptable to hold an open-ended container 8 for the eggs, and is pivotally mountable on the support at 10 to swing (FIG. 2) between a first position (FIG. 4) in which the eggs 12 are retained in the container against discharge through the end opening 14 of the same by gravity, and a second position (FIG. 5) in which one or more eggs tend to discharge through the end opening of the container by gravity. Furthermore, the apparatus comprises lid-forming means 16 for the container which also form a recess 18 (FIG. 6) on the device into which an egg or eggs can discharge from the end opening of the container when the container is swung between the respective positions thereof. The recess 18 is open to the ambient surroundings of the container, but there are means 20 forming a cover for the opening when the container is disposed in the first position thereof. The cover means 20 are manually shiftable in relation to the rim 24 of the opening to expose the same to the ambient surroundings of the container when the container assumes the second position thereof. However, the opening is adapted so that when it is exposed, the eggs remain cradled in the recess 18 while the fisherman is able to pluck one of them from the same with the hook 26 of his line (FIG. 7), or the thumb and finger of his free hand.

More particularly, the harness 2 includes a bibb 28 of cloth, plastic, leather or other suitable material having a tongue 30 at the bottom thereof to which a belt 32 is adjustably connected, to enable the bibb to be cinched to the fisherman's torso when the neck strap 34 of the same is secured about his neck. The belt 32 has elastic midsections 36 as well as a pair of buckled ends 38 with which it can be adjusted in diameter. The connection 40 between it and the tongue is similarly adjustable, moreover, so that the user can fit the harness to his torso and then repeatedly mount it on his torso in a ready-to-use condition, simply by snap-engaging a clasp 42 at the rear of the belt.

Rigidly ensconced on the face of the bibb 28 is an L-shaped support 44, the longer leg 44' of which is vertically upstanding opposite the bibb. The leg 44' is hemispherical at the top and has a circumferential groove 46 about the upper body thereof. A thimble-like swivel head 48 is rotatably journaled on the top of the leg, and is detachably engaged with the leg by means of a setscrew 50 that is threadedly carried in the same to be secured against the bottom of the groove 46 when the head has the desired orientation, as shall be explained.

The device 6 itself includes a flexible collar 52 which is axially split at one side thereof but equipped with opposing tabs 54 at the split so that the collar can be opened and closed by means of a pair of spring-loaded clamping screws 56 interengaged between the tabs. One end of the collar is flanged, and in use, a jar 58 of salmon eggs is purchased and inserted into the collar at the end, and then secured within the same by adjusting the screws until the caged springs 60 yieldably bias the collar into a closed condition.

The device is pivotally mounted on an arm 62 which is angularly upwardly cantilevered from the swivel head 48 and clevised to a lug 64 on the collar 52 at the upper end thereof. The end has a lip 66 thereon, however, which engages the lug when the collar and jar are swung into a substantially vertical orientation, such as that shown in phantom in FIG. 2. The over-center disposition of the lug also assures that the jar will remain in this orientation until disturbed, such as being pushed over center by the fisherman. At that time, it will swing downward by its own weight and through the arc of about 110° from the vertical. At the bottom of the arc, it engages a stop 68 which limits the downward travel of it in a manner to be explained. The stop 68 also operates to dislodge the eggs from the jar, as shall also be explained.

Salmon egg jars are conventionally threaded at the top to accommodate a correspondingly threaded lid thereon (not shown). In use, the jar is stripped of its lid and a cap-like substitute lid 70 is threadedly engaged on the jar to form the aforementioned covered but selectively uncoverable trough-like recess 16 for receiving one or more eggs to be removed from the apparatus. The lid or cap 70 is in two parts, one of which, 72, has an elephant-like appearance and forms a chute-fed trough 74 for the eggs. The other part, 76, is transparent, thimble-like and adapted to form a selectively openable cover 78 for the trunk or snout 80 (FIGS. 4 and 5) of the first part. The chute 82 of the first part is frusto-conical in latitudinal cross section, but more triangular in longitudinal cross section, so that it has a floor 84 and a ceiling 86 which arches and then angles downwardly towards the same in the direction of the outlet 88 of the chute. The outlet 88 in turn is formed into a tubular nipple 90, the floor of which has a part-annular rabbet 92 therein. The shoulder 94 of the rabbet is disposed within the hollow of the chute to accommodate the snout 80 of the cap, as shall be explained. In addition, the receiving end 96 of the chute is also rabbeted, as well as threaded to engage on the threading 98 of the jar.

The snout 80 and cover 78 comprise a pair of complementary telescopically engaged tubular members, the inner of which, 100, is adapted to be inserted in the nipple 90 of the chute and secured to the same in abutting relationship with the shoulder 94 of the rabbet 92. It is adapted, moreover, to extend several-eggs-abreast beyond the end of the nipple, before terminating in a bulkhead 102 having an arcuate fillet 104 at the inside corner thereof. The top of the inner member is relieved so that the trough 74 has the aforementioned opening 22 therein when the device is disposed in the downwardly inclined condition of FIG. 2. The rim 24 of the opening begins at a point spaced outwardly from the end of the nipple, but the opposing walls of the trough are sufficiently deep to assure that the eggs remain cradled in the trough when the device is disposed in the foregoing conditions of FIG. 2.

A circumferential bead 106 is upstanding about the unrelieved portion of the inner member adjacent the nipple, for reasons which will be explained. Also, there are thumbprint-like ramps 107 on the walls of the trough, which are inclined to the bottom thereof and disposed approximately one egg short of the bulkhead 102 of the inner member.

The outer member 108 is transparent and thimble-like in construction, as indicated, and is adapted to telescope about the inner member in rotatable engagement with the end of the nipple and the bulkhead 102. A circumferential groove 110 in the bore of the outer member snap-engages over the bead 106 of the inner member to interengage the members against other than forcible disengagement, while at the same time allowing the outer member to be rotated about the inner member as indicated.

The outer member is relieved at one side thereof to form a port 112 therein, the rim 114 of which is adapted to register with the rim 24 of the opening 22 in the inner member. However, when the outer member is rotated from that point through 180°, the port is removed from the registry with the opening and the opening is closed by the unrelieved side 108' of the outer member. Rotation is effected by means of a knob 116 on the outer end of the outer member, the stem 118 of which is sufficiently long to place the knob well clear of the trough, for reasons which shall be explained.

Interiorly, the chute 82 has a pair of spaced parallel, longitudinally extending ribs 119 on the floor 84 thereof. The floor section between the ribs exists through the nipple, flush with the trough of the inner member 100. Meanwhile, the inside end 120 of the member forms a marquee over the bottom of the chute. The ceiling space above the marquee 120 can accommodate only a single egg rotationally of the chute; and the floor space between the ribs 119 can likewise accommodate the eggs only in single file. Together then, the features collimate the eggs lengthwise of the trough and avoid a jam-up of eggs at the outlet of the chute. In the trough, moreover, the second to last of the eggs takes up a position between the ramps 107 on the walls of the trough.

To assure that the eggs tumble and collimate as desired, the cap 70 is engageable with the head 48 when the device reaches its full downward inclination. See FIGS. 2 and 3. Preferably, the head is equipped with an adjustable stop 68 as shown, so that the maximum incline can be set about 15° to either side of the 110° arc. The stop takes the form of a bolt 122 which is threadedly engaged in the head along a general radius to the arc. Raising and lowering the head 124 of the bolt adjusts the incline. Also, a shallow socket-like recess 126 in the outside of the swivel head enables the head of the bolt to retract into the swivel head in the maximum stop position. A wing nut 128 provides for detachable retention of the bolt on the swivel head.

In use, the device 6 is mounted on the support 44 and rotated about the leg 44' of the same to assume an orientation at which it can be readily swung up and down in a plane most convenient to the user. The setscrew 50 is then interengaged with the groove 46 to fix it in this orientation, and the device is raised to its upright condition for storing. Thereafter, when he desires to obtain an egg from the device, the user grasps it in his free hand, or "ticks" it with the same, to swing the device downwardly into the full-line position of FIG. 2. In this position, the cap 70 engages the stop 68, giving the eggs a jar and causing them to tumble into the bottom of the chute about the marquee 119 of the snout. Certain eggs collimate into the trough 74 of the snout 80 as shown, and present themselves to the user through the transparency of the cover 76. The user than grips the knob 116 and rotates the cover until the port 112 registers with the opening 22 of the snout. He may the probe the tip of one finger or thumb into the trough to roll an egg up the incline of a ramp 107 to a point at which he can grip the egg between his finger and thumb for removal from the device. Or he may impale the hook 26 of his fishing line through an egg and use the hook to remove it from the device. In such a case, the filleted inside corner 104 of the bulkhead 102 acts to elevate the forwardmost egg above the others in the trough, and enables it to be most readily hooked for this purpose, as seen in FIG. 7. Also, the knob is sufficiently forward of the trough to assure that it does not interfere with the action.

What is claimed is:

1. Apparatus whereby a fisherman can store a batch of salmon eggs or the like on his body, and when he needs one, isolate it from the batch and pluck it out of storage on the hook of his line, or between the thumb and one finger of his free hand, comprising means for forming a support on the fisherman's body opposite the front thereof, a device which is adaptable to form an open ended container for the eggs and pivotally mountable on the support adjacent the front of the fisherman's body to swing between a first position in which the eggs are retained in the container against discharge through the open end of the same gravity, and a second position in which one or more eggs tend to discharge through the open end of the container by gravity, means for forming a lid on the open end of the container, said lid forming means having an elongated trough-like recess formed therein for receiving eggs discharged from the open end of the container, and means thereon for causing the eggs to collimate in the recess lengthwise thereof when the container is swung between the first and second positions thereof, respectively, there being an opening in the lid forming means opposite the recess for access to the same, and said recess and access opening being formed on the lid forming means so that they are relatively upwardly oriented of the fisherman's body when the container assumes the second position thereof on the front of his body, and means on the lid forming means which are operable to cover the access opening when the container is disposed in the second position thereof, but which are shiftable in relation to the access opening to uncover the same to the ambient surroundings of the container when desired, said lid forming means being adapted so that when eggs are received in the recess and exposed upwardly of the fisherman's body through the uncovered access opening thereof in the second position of the container, the fisherman can insert the tip of the thumb or one finger of his free hand through the access opening and into the recess to engage an egg in such a way as to enable him to pluck the egg from the recess and thus from the apparatus, between the thumb and one finger of his free hand.

2. The apparatus according to claim 1 wherein the lid-forming means are adapted to form a tubular chute between the container and the recess, and the collimating means are disposed in the chute adjacent the outlet thereof.

3. The apparatus according to claim 2, wherein the collimating means include means in the bottom of the chute to limit rotational and transverse movement of the eggs adjacent the outlet of the chute.

4. The apparatus according to claim 3, wherein the movement-limiting means include a pair of space-parallel ribs on the floor of the chute and a marquee between the floor and ceiling of the same.

5. The apparatus according to claim 1, wherein the recess is filleted at the distal end thereof to elevate the forwardmost egg for impalement by a hook.

6. The apparatus according to claim 1, wherein the opposing side walls of the recess have ramps thereon which are inclined to the bottom of the recess so that an egg can be slid or otherwise manipulated up the incline of one of the same to a point at which it can be gripped between the fisherman's finger and thumb for removal from the apparatus.

7. The apparatus according to claim 1, wherein the cover means are transparent to enable the eggs to be seen in the recess when the access opening is covered by the same.

8. The apparatus according to claim 1, wherein the lid-forming means have a cylindrical snout in which the recess is located and the cover means are engaged on the snout to rotate about the cylindrical axis thereof.

9. The apparatus according to claim 1, wherein the lid-forming means and the cover means include a pair of telescopically-engaged members, the inner of which has a top opening therein when the container is disposed in the second position thereof, and the outer of which has a port therein adapted to register with the top opening in one angular orientation of the outer member about the inner member, but to be removed from registry with the top opening when the outer member is rotated 180° from said orientation.

10. The apparatus according to claim 1, wherein the device includes means adaptable to hold an open-ended container in the aforesaid position and to which the lid-forming means are connectable at the open end thereof.

11. The apparatus according to claim 10, wherein the container holding means have a socket therein to receive the container, and there are means on the same for retaining the container within the socket.

12. The apparatus according to claim 1, wherein the support forming means take the form of a bibb-like harness mountable on the fisherman's torso to provide a sconce-like support at the front thereof.

13. The apparatus according to claim 12, wherein the harness has an L-shaped support thereon, one leg of which is vertically upstanding opposite the bibb of the harness and has a swivel heat at the top thereof; and wherein the device is pivotally mounted on an arm cantilevered from the head to swing between the respective positions of the container in the various angular orientations of the head.

14. The apparatus according to claim 13, further comprising means forming stops for the respective positions of the container.

15. The apparatus according to claim 14, wherein one stop is adjustable to vary the inclination at which the container assumes the second position thereof.

16. The apparatus according to claim 1, wherein the cover means are engaged on the lid-forming means to rotate about the longitudinal axis of the recess, and there is a port in the cover means registrable with the access opening to expose the same to the ambient surroundings of the container in one angular orientation of the cover means.

17. Apparatus whereby a fisherman can store a batch of salmon eggs or the like in an open ended container, and when he needs one, isolate it from the batch and pluck it out of storage on the hook line, or between the thumb and one finger of his free hand, comprising an attachment adapted to be connected to the container to form a lid on the open end thereof, said attachment having an elongated trough-like recess formed therein for receiving eggs discharged from the container when the container is tipped into a position in which one or more eggs tend to discharge through the open end thereof by gravity, there being means on the attachment for causing the eggs to collimate in the recess lengthwise thereof when the container is tipped into the aforesaid position thereof, and an opening in the attachment opposite the recess for access to the same, said recess and said access opening being formed on the attachment so that they are relatively upwardly oriented of the fisherman's body when the container assumes the tipped position thereof, and means on said attachment which are operable to cover the access opening when the container is tipped into the aforesaid position thereof, but which are shiftable in relation to the access opening to uncover the same to the ambient surroundings of the attachment when desired, said attachment being adapted so that when eggs are received in the recess and exposed upwardly of the fisherman's body through the uncovered access opening thereof in the tipped position of the container, the fisherman can insert the tip of the thumb or one finger of his free hand through the access opening and into the recess to engage an egg in such a way as to enable him to pluck the egg from the recess and thus from the apparatus, between the thumb and one finger of his free hand.

18. The apparatus according to claim 17 wherein the attachment is adapted to form a tubular chute between the container and the recess, and the collimating means are disposed in the chute adjacent the outlet thereof.

19. The apparatus according to claim 18, wherein there is a pair of telescopically engaged members on the chute, the inner which has the recess and access opening therein, and the outer of which has a port therein adapted to register with the access opening in one angular orientation of the outer member about the inner member, but to be removed from registry with the access opening when the outer member is rotated 180° from said orientation.

20. Apparatus whereby a fisherman can store a batch of fish bait morsels on his body, an when he needs one, isolate it from the batch and pluck it out of storage on the hook of his line, or between the thumb and one finger of his free hand, comprising means for forming a support on the fisherman's body opposite the front thereof, a device which is adaptable to form an open ended container for the morsels and pivotally mountable on the support to swing between a first position in which the morsels are retained in the container against discharge through the end opening of the same by gravity, and a second position in which one or more morsels tend to discharge through the end opening of the container by gravity, means for forming a recess on the device into which a morsel or morsels can discharge from the end opening of the container when the container is swung between the first and second positions thereof, respectively, the recess being open to the ambient surroundings of the container, but there being means on the device for covering the opening when the container is disposed in the first position thereof, said cover means being shiftable in relation to the rim of the opening to expose the opening to the ambient surroundings of the container when the container assumes the second position thereof, and the opening being adapted when it is so exposed, so that the morsels remain cradled in the recess, while the fisherman is able to pluck one of the morsels from the recess on the hook of his line or between the thumb and one finger of his free hand, the recess being an elongated, trough-like recess and there being means forming a chute between the container and the recess, and means adjacent the outlet of the chute for collimating the morsels in the recess lengthwise thereof, including a pair of spaced parallel ribs on the floor of the chute and a marquee between the floor and ceiling of the same, to limit rotational and transverse movement of the morsels adjacent the outlet of the chute.

21. Apparatus whereby a fisherman can store a batch of fish bait morsels on his body, and when he needs one, isolate it from the batch and pluck it out of storage on the hook of his line, or between the thumb and one finger of his free hand, comprising means for forming a support on the fisherman's body opposite the front thereof, a device which is adaptable to form an open ended container for the morsels and pivotally mountable on the support to swing between a first position in which the morsels are retained in the container against discharge through the end opening of the same by gravity, and a second position in which one or more morsels tend to discharge through the end opening of the container by gravity, means for forming a recess on the device into which a morsel or morsels can discharge from the end opening of the container when the container is swung between the first and second positions thereof, respectively, the recess being open to the ambient surroundings of the container, but there being means on the device for covering the opening when the container is disposed in the first position thereof, said cover means being shiftable in relation to the rim of the opening to expose the opening to the ambient surroundings of the container when the container assumes the second position thereof, and the opening being adapted when it is so exposed, so that the morsels remain cradled in the recess, while the fisherman is able to pluck one of the morsels from the recess on the hook of his line or between the thumb and one finger of his free hand, the opposite side walls of the recess having ramps thereon which are inclined to the bottom of the recess so that a morsel can be slid or otherwise manipulated up the incline of one of the same to a point at which it can be gripped between the fisherman's finger and thumb for removal from the apparatus.

* * * * *

UNITED STATES PATENT AND TRADEMARK OFFICE
CERTIFICATE OF CORRECTION

PATENT NO. : 4,483,092
DATED : November 20, 1984
INVENTOR(S) : John Steiner

It is certified that error appears in the above-identified patent and that said Letters Patent is hereby corrected as shown below:

Column 3, Line 13, illustrates, should be illustrate.

Column 4, Line 58, "recess 16" should be "means 16."

Column 5, Line 58, "exists" should be "exits."
Column 6, line 58, after "same", the word "by" should be inserted.

Claim 10, line three thereof, "position" should be positions.

Claim 13, line 4 thereof, "heat" should be "head."

Claim 17, line 4 thereof, after "hook", of his should be inserted.

Signed and Sealed this

Thirtieth Day of April 1985

[SEAL]

Attest:

DONALD J. QUIGG

*Attesting Officer*  *Acting Commissioner of Patents and Trademarks*